United States Patent [19]
Uetrecht

[11] Patent Number: 5,098,041
[45] Date of Patent: Mar. 24, 1992

[54] ATTITUDE CONTROL SYSTEM FOR MOMENTUM-BIASED SPACECRAFT

[75] Inventor: David S. Uetrecht, Redondo Beach, Calif.

[73] Assignee: Hughes Aircraft Company, Los Angeles, Calif.

[21] Appl. No.: 534,216

[22] Filed: Jun. 7, 1990

[51] Int. Cl.[5] .............................................. B64C 1/20
[52] U.S. Cl. ................................... 244/164; 244/171; 244/172
[58] Field of Search ............... 244/164, 165, 169, 170, 244/171, 172; 364/459

[56] References Cited

U.S. PATENT DOCUMENTS

| | | | |
|---|---|---|---|
| 3,547,381 | 12/1970 | Shaw | 244/169 X |
| 3,624,367 | 11/1971 | Hamilton | 364/459 |
| 3,866,025 | 2/1975 | Cavanagh | 364/459 |
| 4,071,211 | 1/1978 | Muhlfelder et al. | 244/165 |
| 4,370,716 | 1/1983 | Amieux | 244/169 |
| 4,504,912 | 3/1985 | Brüderle et al. | 364/459 |
| 4,758,957 | 7/1988 | Hubert et al. | 244/169 |
| 4,786,018 | 11/1988 | Cope | 244/164 |
| 4,791,573 | 12/1988 | Zemany et al. | 364/459 |
| 4,848,706 | 7/1989 | Garg et al. | 244/169 |
| 4,931,942 | 6/1990 | Garg et al. | 244/170 |
| 4,961,551 | 10/1990 | Rosen | 244/172 |

Primary Examiner—Joseph F. Peters, Jr.
Assistant Examiner—Virna Lissi Mojica
Attorney, Agent, or Firm—Steven M. Mitchell; Robert A. Westerlund; Wanda K. Denson-Low

[57] ABSTRACT

An attitude and nutation control system (30) for a momentum-biased vehicle (10) having roll, pitch, and yaw axes which employs a normal mode estimator (32) which predicts steady-state values for roll attitude, roll rate, and yaw rate. The normal mode estimator (32) receives instantaneous roll attitude information from an earth sensor (34) and optionally receives roll and/or yaw rate information from roll gyro (35a) and yaw gyro (35b). A logic circuit (36) coupled to the normal mode estimator (32) generates correction signals when the steady-state values for roll attitude, roll rate, and yaw rate are outside predetermined limits. A plurality of thrusters (14a-d) produce torque for bringing the steady-state values for roll attitude, roll rate, and yaw rate within predetermined limits. A sample/hold-off control circuit (68) samples correction signals between thruster activations while a optimal thruster selection logic (70) employs a linear program to compute torques associated with changes in the correction signals for use by the normal mode estimator (32), as well as activating selected thrusters (14a-d).

15 Claims, 3 Drawing Sheets

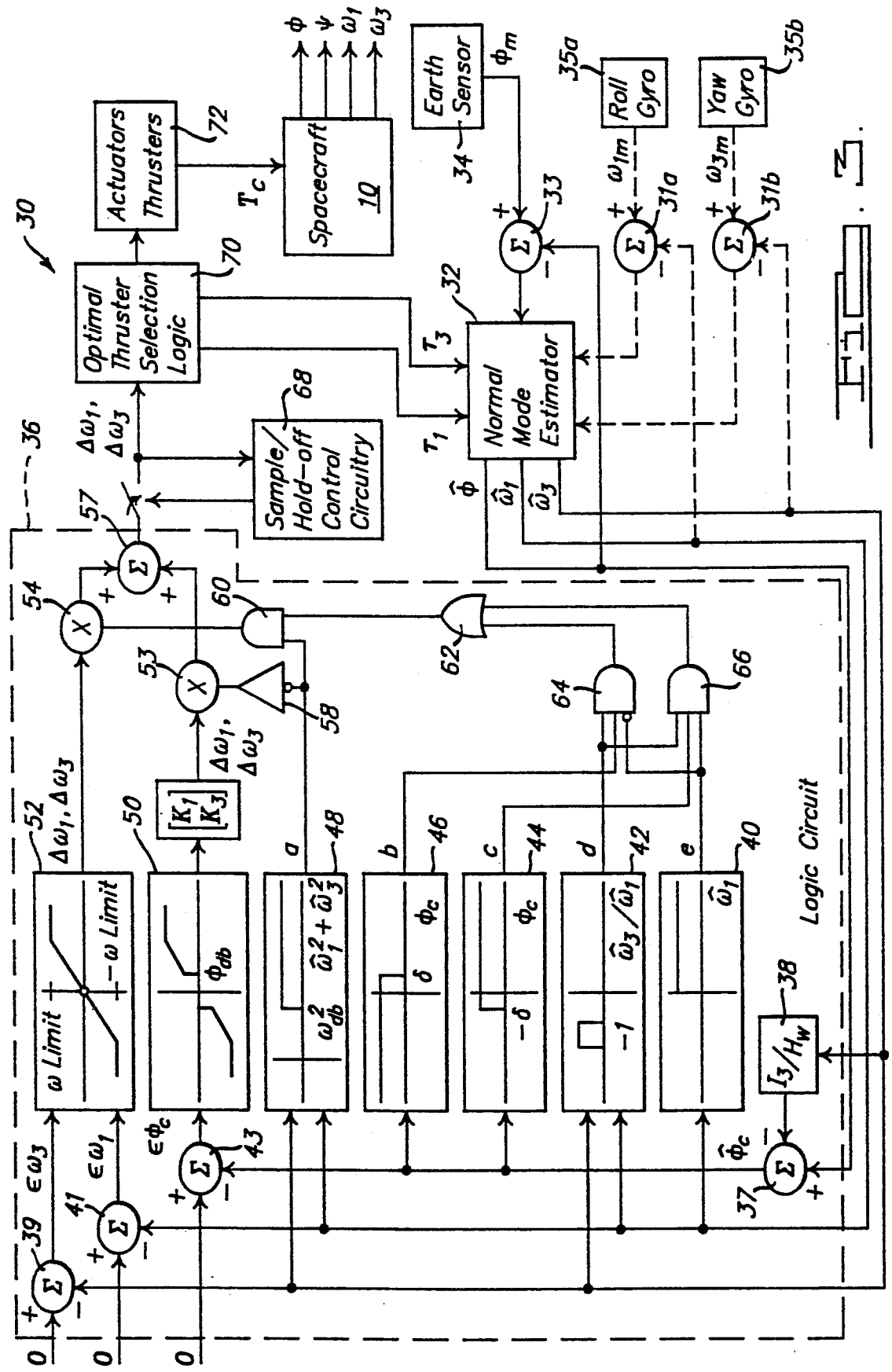

ATTITUDE CONTROL SYSTEM FOR MOMENTUM-BIASED SPACECRAFT

BACKGROUND OF THE INVENTION

1. Technical Field

The present invention relates to spacecraft control systems, and more specifically to an attitude control system for a momentum-biased spacecraft.

2. Discussion of the Related Art

Momentum-biased spacecraft are characterized by an angular momentum vector oriented primarily along a direction perpendicular to any two of the three spacecraft axes, namely the roll, pitch, and yaw axes. Typically, the angular momentum vector is oriented primarily along the negative pitch direction. Angular momentum can be produced simply by rotating a wheel or disk, having a fixed rotational inertia, at a fixed angular rate.

Momentum biasing simplifies spacecraft control. In a spacecraft having an angular momentum vector oriented primarily along the negative pitch direction, the roll and yaw axes are coupled. This coupling is referred to as gyroscopic coupling. An applied torque causing motion about the yaw axis also causes motion about the roll axis. Similarly, an applied torque causing motion about the roll axis also causes motion about the yaw axis. Torque for changing spacecraft roll and yaw attitudes (or angles) and roll and yaw rates (nutation) can be provided by thrusters which create torques about the roll and yaw axes.

A controller for a momentum biased spacecraft is disclosed in U.S. Pat. No. 3,937,423 "Nutation and Role Error Angle Correction Means", issued Jan. 25, 1974 to D. G. Johannson. The above referenced controller relies on estimated roll error, a roll deadband adjustment in proportion to the recent thruster firing history, and delay timing in order to sense errors and effect corrections. While, this type of control has performed satisfactorily the present invention further improves on these types of control systems.

SUMMARY OF THE INVENTION

In accordance with the teachings of the present invention an attitude control system for a momentum-biased vehicle is provided. In the preferred embodiment the vehicle is a spacecraft in synchronous orbit around a celestial body, such as the earth. The system employs sensor means for measuring instantaneous roll attitude of the spacecraft. A normal mode estimator employs a matrix of state equations to predict steady-state values for roll attitude, roll rate, and yaw rate from instantaneous roll attitude and negative feedback of predicted roll attitude. A logic circuit generates correction signals when the predicted steady-state values are outside predetermined limits. Thrusters produce torque for bringing these steady-state values within predetermined limits. Firing means are also employed to activate the thrusters and predict the torques which will result from the thruster firings for use by the normal mode estimator.

BRIEF DESCRIPTION OF THE DRAWINGS

Additional advantages and features of the present invention will become apparent from the subsequent description and the appended claims taken in conjunction with the accompanying drawings in which:

FIG. 2b illustrates the orbital reference frame and the spacecraft reference frame as used in FIG. 2a;

FIG. 3 is a block diagram of the control system of the present invention;

DETAILED DESCRIPTION OF THE PREFERRED EMBODIMENT

Figure 1:
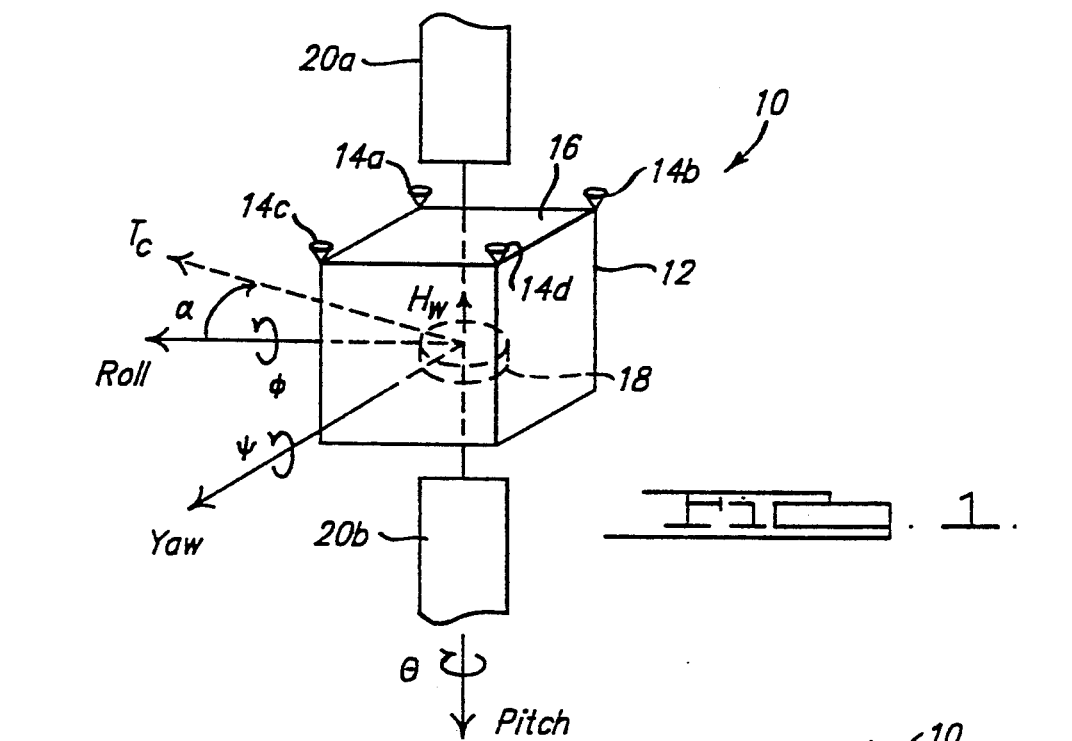
FIG. 1 is a simplified perspective view of a spacecraft centered about the origin of a cartesian coordinate system representing the roll, pitch, and yaw axes.

Turning first to FIG. 1 there is shown a momentum-biased spacecraft 10. The cube 12 represents the structure of the spacecraft 10 which is centered at the origin O of a cartesian coordinate system made up of roll, yaw, and pitch axes, referred to as the body roll, body yaw, and body pitch axes. Thrusters 14(a)-(d) are mounted on surface 16 which is parallel to the body roll/yaw plane. Only four are illustrated for clarity. These thrusters are offset from the body pitch axis and supply torque in the roll/yaw plane for correcting errors in roll and yaw attitudes and rates. $T_C$ is the torque magnitude in the roll/yaw plane and the angle $\alpha$ is its phase. Disk 18 rotates axisymmetrically about the body pitch axis and is a source of angular momentum represented by the vector $H_W$, which is aligned with the body pitch axis and oriented in the negative pitch direction. Solar panels 20a and 20b are aligned along the body pitch axis and are used to supply electrical power for the spacecraft electronics. Roll attitudes are measured about the body roll axis and are represented by the angle $\phi$. Yaw attitudes are measured about the body yaw axis and are represented by the angle $\psi$, and finally pitch angles are measured about the body pitch axis and are represented by the angle $\theta$.

Figure 2A:
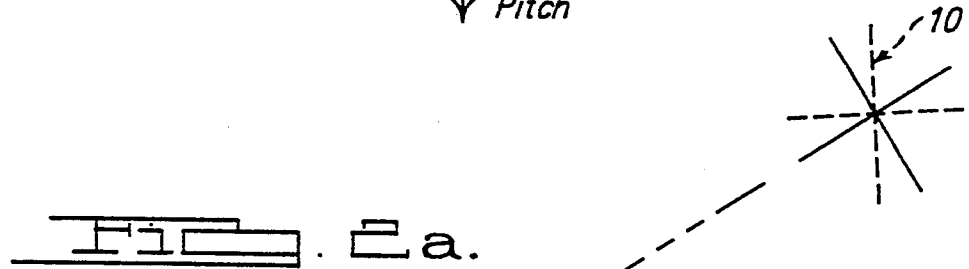
FIG. 2a is a top view of a momentum-biased spacecraft in synchronous orbit about a celestial body.
Figure 2B:
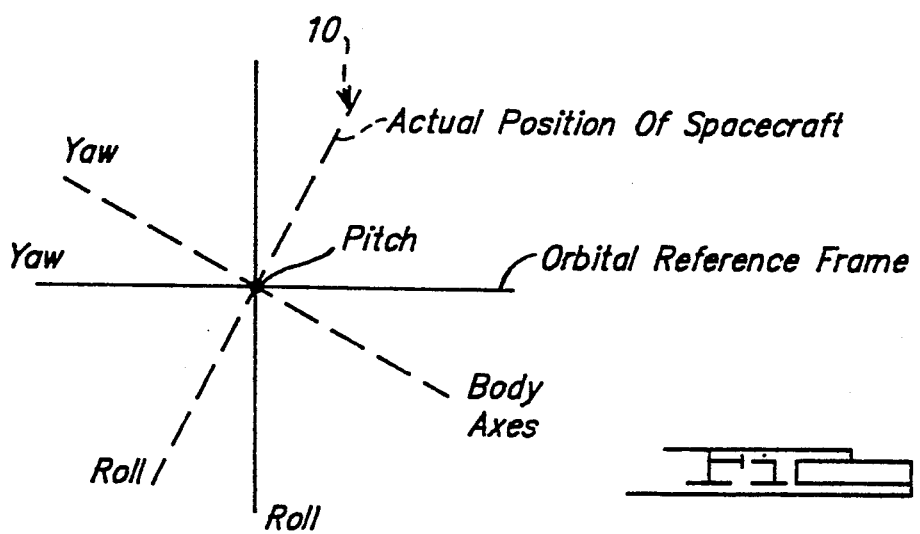

In FIGS. 2a and 2b, the spacecraft 10 is shown orbiting a celestial body 11, such as the earth. In the preferred embodiment, the spacecraft 10 must follow a synchronous orbit so as to maintain radio contact with the earth. The orbital frame of reference rotates at a constant rate of $\omega_O$ about the orbital pitch axis with the orbital yaw axis directed towards the center of the earth. It is desirable for the body axes of the spacecraft to coincide with the orbital reference frame at all times. However, disturbance torques cause the body axes to deviate from the orbital reference frame. These disturbance torques are caused by solar pressures, gravity gradients and magnetic dipoles. The primary purpose of the present invention is to produce control torques which will realign the body roll and yaw axes with the orbital reference frame. Pitch angles are controlled separately as motion about the body pitch axis is decoupled from motion about the body roll and yaw axes.

Turning now to FIG. 3, the control system 30 of the present invention is shown. The control system 30 is contained within the spacecraft 10 and is used to monitor deviations from desired spacecraft attitudes and rates and signal the thrusters to position the spacecraft so as to eliminate these errors. The heart of the control system 30 is the normal mode estimator 32 which estimates what steady-state roll attitudes and steady-state roll and yaw rates will be after thrusters are fired. These quantities are called estimated roll attitude and estimated roll and yaw rates and are represented in FIG. 3 as $\hat{\phi}$, $\hat{\omega}_1$ and $\hat{\omega}_3$.

In the preferred embodiment, the normal mode estimator 32 receives instantaneous roll attitude information from an earth sensor 34. The earth sensor 34 estimates where the center of the earth is and generates an output representing the measured roll attitude $\phi_m$ of the spacecraft with respect to the orbital reference frame. At summing node 33, the measured roll attitude $\phi_m$ is combined with estimated roll attitude $\hat{\phi}$ fed back from the output of the normal mode estimator 32.

In addition, roll and yaw gyros 35a and 35b may also be employed, especially when yaw attitude errors are large. Roll gyro 35a generates a measured roll rate $\omega_{1m}$ and yaw gyro 35b generates a measured yaw rate $\omega_{3m}$. At summing node 31a, measured roll rate $\omega_{1m}$ is combined with estimated roll rate $\hat{\omega}_1$ fed back from the output of the normal mode estimator 32. At summing node 31b, measured yaw rate $\omega_{3m}$ is combined with estimated yaw rate $\hat{\omega}_3$ fed back from the output of the normal mode estimator 32.

The normal mode estimator 32 employs a microprocessor programmed with a matrix of state equations of the following form:

$$\begin{bmatrix} \hat{\phi} \\ \hat{\psi} \\ \hat{\omega}_1 \\ \hat{\omega}_3 \end{bmatrix} = A \begin{bmatrix} \hat{\phi} \\ \hat{\psi} \\ \hat{\omega}_1 \\ \hat{\omega}_3 \end{bmatrix} + B \begin{bmatrix} \tau_1 \\ \tau_3 \end{bmatrix} + K_a (\phi_m - \hat{\phi}) +$$

$$K_b \begin{bmatrix} \omega_{1m} - \hat{\omega}_1 \\ \omega_{3m} - \hat{\omega}_3 \end{bmatrix}$$

where A and B are matrices which model the roll/yaw dynamics and kinematics of the spacecraft and $K_a$ and $K_b$ are matrices of feedback gains. The term $$K_b \begin{bmatrix} \omega_{1m} - \hat{\omega}_1 \\ \omega_{3m} - \hat{\omega}_3 \end{bmatrix}$$

is added only when roll and yaw gyros 35a and 35b are available. After thrusters are fired, the normal mode estimator 32 receives continuous updated measured roll attitude $\phi_m$. Continuously feeding back estimated roll attitude $\hat{\phi}$, it generates new solutions for estimated roll attitude $\hat{\phi}$, estimated roll rate $\hat{\omega}_1$, and estimated yaw rate $\hat{\omega}_3$. These estimates reach a steady-state condition after many iterations of the state equations and before thrusters are fired again.

The outputs of the normal mode estimator are coupled to logic circuit 36, which implements transfer functions 38 through 52. A software logic function is associated with each transfer function.

Estimated roll rate $\hat{\omega}_1$ and estimated yaw rate $\hat{\omega}_3$ are compared with commanded roll and yaw rates at summing nodes 39 and 41 to determine roll and yaw rate errors $\epsilon\omega_1$ and $\epsilon\omega_3$. Estimated roll attitude $\hat{\phi}$ is combined at summing node 37 with the estimated yaw rate $\hat{\omega}_3$ in transfer function 38 of logic unit 36 to determine the roll component $\hat{\phi}_C$ of the spacecraft angular momentum vector $H_W$. $I_3$ represents the inertia of the spacecraft 10 about the yaw axis. The estimated roll component $\hat{\phi}_C$ is compared with the commanded roll component at summing node 43 to determine the roll component error $\epsilon\phi_C$. Commanded roll attitudes and rates are zero for most applications; however, they could be set to a non-zero number to offset sensor bias.

Roll and yaw rate errors $\epsilon\omega_1$ and $\epsilon\omega_3$ and roll component error $\epsilon\phi_C$ are fed into transfer functions 50 and 52 of logic circuit 36 which generate correction signals $\Delta\omega_1$ and $\Delta\omega_3$ necessary to eliminate these errors. Transfer function 52 produces a first set of correction signals which are proportional to roll and yaw rate errors $\epsilon\omega_1$, and $\epsilon\omega_3$. The $\omega$ limit and $-\omega$ limit represent points of maximum correction. The circle at the origin of the transfer function represents an infinitesimally small deadband in which no corrections are necessary.

Transfer function 50 produces a second set of correction signals which are proportional to roll component error $\epsilon\phi_C$. The range $\phi_{db}$ represents a deadband range in which no corrections are necessary.

The output of transfer function 50 is fed into gain circuit 56, which produces gains $K_1$ and $K_3$. The gain circuit 56 amplifies the second set of correction signals. Gains $K_1$ and $K_3$ may be preset before the spacecraft is launched.

Logic circuit 36 also employs transfer functions 40-48. Transfer function 48 inputs estimated roll and yaw rates $\hat{\omega}_1$ and $\hat{\omega}_3$. Its output, a, is high when the square of the nutation rate exceeds the square of the rate deadband $\omega_{db}$. The nutational rate is defined as the square root of the sum of the squares of the estimated roll and yaw rates $\hat{\omega}_1$ and $\hat{\omega}_3$.

Transfer functions 44 and 46 input the estimated roll component $\hat{\phi}_C$. The output, b, of transfer function 46 is high when the estimated roll component $\hat{\phi}_C$ is less than some predetermined $\delta$. The output c of transfer function 44 is high when the estimated roll component $\hat{\phi}_C$ is greater than $-\delta$. $\delta$ is determined by calculating the uncertainty in $\hat{\phi}_C$ due to uncertainties in $I_3$ and $H_W$.

Transfer function 42 inputs estimated roll and yaw rates $\hat{\omega}_1$ and $\hat{\omega}_3$. The output d is high when the quotient of $\hat{\omega}_1$ and $\hat{\omega}_3$, which is a partial measure of the phase of the nutation, is close to minus one ($-1$).

Transfer function 40 inputs estimated roll rate $\hat{\omega}_1$. The output, e, is high when estimated roll rate $\hat{\omega}_1$ is greater than zero.

Transfer functions 40 through 48 work in conjunction with amplifier 58, AND gate 60, OR gate 62, AND gate 64, AND gate 66, and multiplication nodes 53, 54, and 57 to establish priority for controlling nutation and attitude corrections. For example, signal a allows only rate corrections when the nutational rate is greater than the rate deadband $\omega_{db}$. In addition, rates are corrected only when the phase of the nutation is $3\pi/4$ or $-\pi/4$. The estimated roll component $\hat{\phi}_C$ must be greater than $-\delta$ for rate corrections when the phase is $-\pi/4$, and must be less than $\delta$ for rate corrections when the phase is $3\pi/4$. Once the nutational rate is below the rate deadband $\omega_{db}$, attitude corrections are possible.

Since the control system 30 corrects roll and yaw rate errors $\epsilon\omega_1$ and $\epsilon\omega_3$ based upon the estimated roll component $\hat{\phi}_C$ of the spacecraft momentum vector $H_W$, nutation control and attitude control are also coupled. This coupling allows nutation corrections to provide attitude corrections as well, thereby minimizing overall thruster usage and increasing fuel economy. Furthermore, by controlling the estimated roll component $\hat{\phi}_C$ of the spacecraft momentum vector $H_W$, it is possible to guarantee roll capture within some deadband, with residual nutation less than the rate deadband, without the possibility of a limit cycle. Yaw attitude is controlled indirectly through orbital coupling. The system 30 is capable of correcting spacecraft orientation even in the presence of large attitudes and rates.

In accordance with the priorities established above, the output of transfer function 52 is multiplied by the output of AND gate 60. The output of transfer function 50 is multiplied by the output of amplifier 56. The outputs of AND gate 60 and amplifier 56 are never simultaneously true. The two products are added to produce the correction signals $\Delta\omega_1$ and $\Delta\omega_3$.

The sample/hold-off control circuit 68 establishes a minimum delay between thruster firings. This delay is long enough to permit estimated roll attitude $\hat{\phi}$ and estimated roll and yaw rates $\hat{\omega}_1$ and $\hat{\omega}_3$ to settle between thruster firings. Normally, there are three time constants between thruster firings to allow estimated rates and roll attitude to settle.

The optimal thruster selection logic (OTS) 70 contains an algorithm employing a linear program which converts correction signals $\Delta\omega_1$ and $\Delta\omega_3$ to thruster on times (or durations of activation). It also picks the optimal set of thrusters and gives firing commands to the actuators 72. The OTS also computes the torques, $\tau_1$, and $\tau_3$, which will be created by the thruster firings, and which are fed into the normal mode estimator.

A standard measure of thruster performance is the impulse bit (ibit). The ibit is defined as the product of thrust magnitude and thrust time, in units of pounds-seconds. For a given amount of thrust, the ibit is determined by the thrust time. Statistically, ibits follow a normal distribution curve with 99.7 percent of all ibits falling within three standard deviations, $3\sigma$ of the mean. The control system of the present invention is capable of using thrusters that exhibit a large minimum ibit and large $3\sigma$ ibit uncertainty with respect to the spacecraft bias momentum and roll attitude pointing requirement:

$$\frac{(\text{min ibit} + 3\sigma \text{ ibit uncertainty})(\text{thruster torque arm})}{H_w} \approx \frac{\text{maximum roll attitude}}{2}$$

This architecture is simpler and less expensive than architectures that also use smaller thrusters, but is the cause of the inadequate performance exhibited by previous controllers. The sizes of the roll deadband $\phi_{db}$ and the rate deadband $\omega_{db}$ direct functions of the minimum thruster ibit and the $3\sigma$ ibit variance.

Control is accomplished by commanding impulsive torques with magnitude $T_C$ and phase $\alpha$ in the body roll/yaw plane. The control torques are commanded at a maximum rate of four to five impulsive torques per nutation period. Hence, motion of the body axes projected onto the orbital roll/yaw plane is characterized by circular arcs whose centers drift due to orbital coupling and whose magnitudes and phases change instantaneously when thrusters are fired.

Figure 4A:
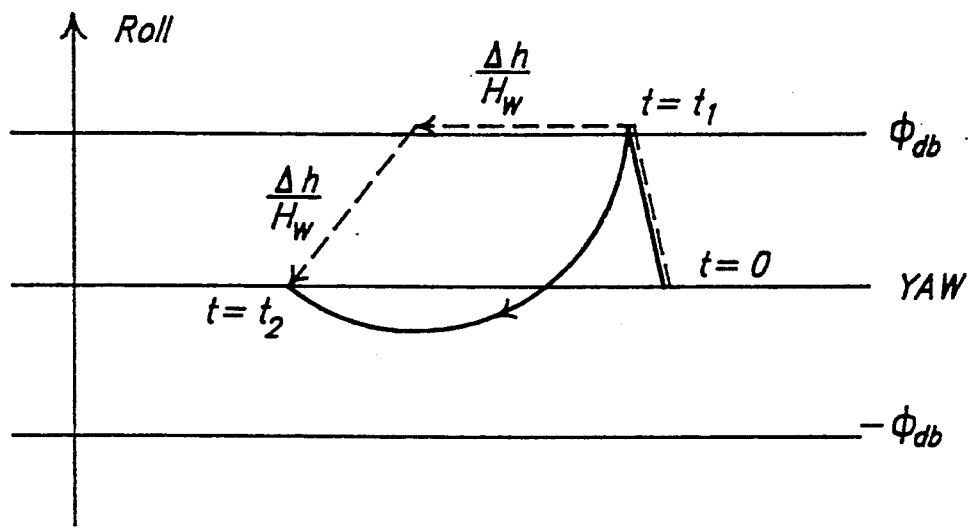
FIG. 4a is a cartesian coordinate system made up of the roll and yaw axes which is used to demonstrate a first theoretical case of error accumulation and the subsequent correction sequence for the control system.

FIG. 4a demonstrates a simple theoretical case of error accumulation and the subsequent correction sequence for the controller when the gain $K_3$ is chosen to be zero and the gain $K_1$ is greater than zero. Movement and correction of the spacecraft are referenced to the orbital roll/yaw plane and the roll deadband $\phi_{db}$. The dotted line reflects the projection of the momentum vector onto the orbital roll/yaw plane. The solid line represents the projection of the body pitch axis onto the orbital roll/yaw plane.

At time $t=0$, the roll component is zero and roll and yaw rates are within the rate deadband $\omega_{db}$. At time $t=1$, orbital coupling has caused the estimated roll component $\hat{\phi}_C$ to exceed the roll deadband $\phi_{db}$. Thrusters are fired. The momentum vector $H_W$ is precessed $\Delta h/H_W$ in the negative yaw direction, where $\Delta h$ equals the change in body roll/yaw angular momentum. The body pitch axis nutates about the momentum vector $H_W$.

At time $t=t_2$, the phase of the nutation is detected to be approximately $-\pi/4$. The estimated roll component $\hat{\phi}_C$ is greater than $-\delta$. Thus, thrusters are fired a second time and the momentum vector $H_W$ is processed $\Delta h/H_W$ at an angle $-\pi/4$. Correction of nutation also causes correction of roll attitude.

Figure 4B:
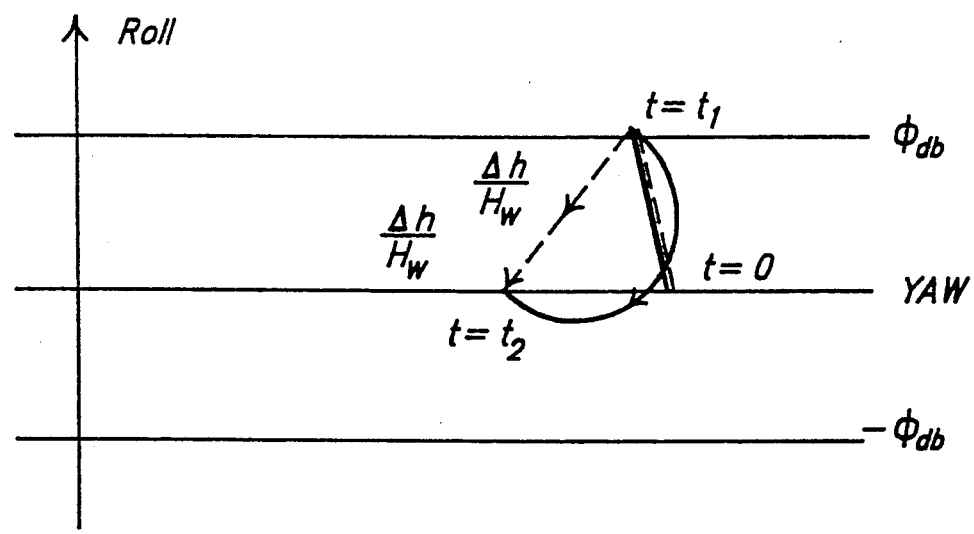
FIG. 4b is a cartesian coordinate system similar to FIG. 4a which is used to demonstrate a second theoretical case of error accumulation and the subsequent correction sequence for the control system.

FIG. 4b demonstrates the case when $K_1 = -K_3$ such that a minimum ibit pulse results when the estimated roll component $\hat{\phi}_C$ equals the positive roll deadband $+\phi_{db}$. The total correction is $-1.41 \Delta h/H_W$ in yaw and $-1.41 \Delta h/H_W$ in roll.

Although the invention has been described with particular reference to certain preferred embodiments thereof, variations and modifications can be effected within the spirit and scope of the following claims.

What is claimed is:

1. An attitude and nutation control system for a momentum-biased vehicle having roll, pitch, and yaw axes comprising:
   (a) sensor means for measuring instantaneous roll attitude;
   (b) estimator means coupled to said sensor means for predicting steady-state values for roll attitude, roll rate, and yaw rate;
   (c) logic means coupled to said estimator means for generating correction signals when the steady-state values for roll attitude, roll rate, and yaw rate are outside predetermined limits;
   (d) a plurality of thrusters for producing torque for bringing the steady-state values for roll attitude, roll rate, and yaw rate within predetermined limits; and
   (e) firing means coupled between said logic means and said thrusters for activating said thrusters in response to the correction signals, said firing means also serving to determine torques associated with changes in the correction signals for use by said estimator means.

2. The system as recited in claim 1 wherein said sensor means comprises inertial means for sensing changes in instantaneous roll and yaw attitudes.

3. The system as recited in claim 2 wherein said inertial means comprises:
   (a) a roll gyro coupled to said estimator means for producing instantaneous roll rate information; and
   (b) a yaw gyro, coupled to said estimator means, for producing instantaneous yaw rate information.

4. The system as recited in claim 1 wherein said sensor means comprises a reference means for measuring instantaneous roll attitude of the vehicle with respect to a celestial body, said vehicle being in orbit around the celestial body.

5. The system as recited in claim 1 wherein said firing means comprises:
   (a) a sampling circuit for sampling correction signals between thruster activations;
   (b) optimal thruster selection means coupled to said sampling circuit for selectively choosing thrusters for activation, for determining the duration of thruster activation, and for determining torques associated with changes in the correction signals; and
   (c) actuators coupled to said optimal thruster selection means for activating said thrusters.

6. The system as recited in claim 1 wherein said estimator means includes a microprocessor programmed with a set of state equations employing negative feedback of steady-state roll attitude values.

7. The system as recited in claim 1 wherein said logic means comprises:
   (a) a microprocessor for implementing software logic functions, a first software logic function receiving the steady-state roll attitude and steady-state yaw rate outputs of said estimator means and determining a roll component of the vehicle's angular momentum vector, a second set of software logic functions generating correction signals, and a third set of software logic functions determining the proper phase of correction signals and whether the roll component, the steady-state roll rate, and steady-state yaw rate exceed predetermined limits;
   (b) comparison means coupled to said microprocessor for generating error signals when the roll component, the steady-state roll rate and yaw rate differ from commanded values, said error signals causing said second set of software logic functions to generate correction signals; and
   (c) control circuit means coupled to said microprocessor for controlling transmission of the correction signals to the firing means.

8. The system as recited in claim 7 further comprising gain control means for amplifying correction signals associated with said roll component when the roll component error signals which are outside predetermined limits.

9. An attitude and nutation control system for a momentum-biased vehicle having roll, pitch, and yaw axes comprising:
   (a) sensor means for measuring instantaneous roll attitude, roll rate, and yaw rate;
   (b) estimator means coupled to said sensor means for predicting steady-state values for roll attitude, roll rate, and yaw rate, said estimator means including a microprocessor programmed with a set of state equations employing negative feedback of steady-state roll attitude, roll rate, and yaw rate values;
   (c) logic means coupled to said estimator means for generating correction signals when the steady-state values for roll attitude, roll rate, and yaw rate are outside predetermined limits, said logic means including a microprocessor for implementing software logic functions, a first software logic function receiving the steady-state roll attitude and steady-state yaw rate outputs of said estimator means and determining a roll component of the vehicle's angular momentum vector, a second set of software logic functions generating correction signals, and a third set of software logic functions determining the proper phase of correction signals and whether the roll component, steady-state roll rate, and steady-state yaw rate exceed predetermined limits, said logic means also including control circuit means for controlling transmission of the correction signals to the firing means, and comparison means coupled to said microprocessor for generating error signals when the roll component, the steady-state roll rate, and the steady-state yaw rate differ from commanded values, said error signals causing said second set of software logic functions to generate correction signals;
   (d) a plurality of thrusters for producing torque for bringing the steady-state values for roll attitude, roll rate, and yaw rate within predetermined limits; and
   (e) firing means coupled between said logic means and said thrusters for activating said thrusters, said firing means including a sampling circuit for sampling correction signals between thruster activations, optimal thruster selection means coupled to said sampling circuit for selectively choosing thrusters for activation, for determining the duration of thruster activation, and for determining torques associated with changes in the correction signals, said firing means also including actuators coupled to said optimal thruster selection means for activating said thrusters.

10. The system as recited in claim 9 wherein said sensor means comprises inertial means for sensing changes in instantaneous roll attitude and yaw attitude, said inertial means including a roll gyro coupled to said estimator means for producing instantaneous roll rate information, and a yaw gyro coupled to said estimator means for producing instantaneous yaw rate information.

11. The system as recited in claim 9 wherein said sensor means comprises a reference means for measuring roll attitude of the vehicle with respect to a celestial body, said vehicle being in orbit about said celestial body.

12. A method for controlling a momentum-biased vehicle having roll, pitch, and yaw axes comprising:
   (a) measuring instantaneous roll attitude of the vehicle;
   (b) predicting steady-state values for roll attitude, roll rate, and yaw rate;
   (c) generating correction signals when the steady-state values for roll attitude, roll rate, and yaw rate are outside predetermined limits;
   (d) producing torque for bringing the steady-state values for roll attitude, roll rate, and yaw rate within predetermined limits; and
   (e) determining torques associated with changes in the correction signals for use in predicting steady-state values for roll attitude, roll rate, and yaw rate.

13. The method as recited in claim 12 further comprising:
   (f) measuring instantaneous roll and yaw rates of the vehicle.

14. The method of claim 13 wherein said step of measuring the instantaneous roll attitude comprises:
   (a) determining the center of a celestial body, said vehicle being in orbit about said celestial body;
   (b) determining a line from the center of said celestial body to the origin of the vehicle axes; and
   (c) measuring the angle between said line and the roll axes.

15. The method of claim 12 wherein said step of producing torque comprises activating a plurality of thrusters.

* * * * *

UNITED STATES PATENT AND TRADEMARK OFFICE
CERTIFICATE OF CORRECTION

PATENT NO. : 5,098,041
DATED : March 24, 1992
INVENTOR(S) : David S. Uetrecht It is certified that error appears in the above-identified patent and that said Letters Patent is hereby corrected as shown below:

Column 1, after the title and before "Background of the Invention", please insert the following paragraph:

"THIS INVENTION WAS MADE WITH GOVERNMENT SUPPORT UNDER CONTRACT NUMBER N00039-C-0300 AWARDED BY THE DEPARTMENT OF THE NAVY. THE GOVERNMENT HAS CERTAIN RIGHTS IN THIS INVENTION"

Signed and Sealed this

Twentieth Day of July, 1993

*Attest:*

MICHAEL K. KIRK

*Attesting Officer*     *Acting Commissioner of Patents and Trademarks*